United States Patent
Holiviers et al.

(10) Patent No.: US 6,913,127 B2
(45) Date of Patent: Jul. 5, 2005

(54) ADJACENT BAFFLE DESIGN FOR SHOCK ABSORBER

(75) Inventors: David Holiviers, Sint-Truiden (BE); Paul Martens, Genk (BE); Jan Hermans, Booischot (BE); Patrick Vanmechelen, Sint-Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/674,025

(22) Filed: Sep. 29, 2003

(65) Prior Publication Data

US 2005/0067240 A1 Mar. 31, 2005

(51) Int. Cl.⁷ .................................................. F16F 9/00
(52) U.S. Cl. ........................................ 188/315; 267/292
(58) Field of Search ............................... 188/315, 314, 188/320, 313, 322.19; 267/286, 292

(56) References Cited

U.S. PATENT DOCUMENTS 2,717,669 A * 9/1955 Roberts ..................... 188/315
3,225,870 A * 12/1965 Heckethorn ................. 188/315
3,931,961 A * 1/1976 Fader et al. ............. 267/64.15
3,945,474 A * 3/1976 Palmer
4,440,273 A * 4/1984 Butler
4,742,898 A * 5/1988 Lee ............................ 188/315

* cited by examiner

Primary Examiner—Robert A. Siconolfi
Assistant Examiner—Melanie Torres
(74) Attorney, Agent, or Firm—Harness, Dickey & Pierce, PLC

(57) ABSTRACT

A dual tube shock absorber includes a baffle located in the reservoir chamber to define a non-linear flow path within the reservoir chamber. The baffle extends between the pressure tube and the reservoir tube such that the non-linear flow path is the only flow path between two portions of the reservoir chamber. One embodiment is a T-shaped baffle, and another embodiment has a base section and an upright section with a wire being embedded in the base section.

16 Claims, 5 Drawing Sheets

ADJACENT BAFFLE DESIGN FOR SHOCK ABSORBER

FIELD OF THE INVENTION

The present invention relates generally to dual tube shock absorbers having a unique baffle design located within the reservoir chamber. More particularly, the present invention relates to a dual tube shock absorber having a baffle located within the reservoir chamber which directs fluid flow to a helical path in order to reduce aeration of the damping fluid.

BACKGROUND OF THE INVENTION

Shock absorbers are used in conjunction with automotive suspension systems and with other suspension systems to absorb unwanted vibrations which occur during movement of the suspension system. In order to absorb these unwanted vibrations, automotive shock absorbers are generally connected between the sprung mass (body) and the unsprung mass (suspension) of the automobile.

One of the most common type of shock absorbers for automobiles is the dual tube dashpot type. These shock absorbers have a piston which is located within a pressure tube. The piston is typically connected to the sprung mass of the vehicle using a piston rod. The piston divides the pressure tube into an upper working chamber and a lower working chamber. Because the piston, through valving, has the ability to limit the flow of damping fluid from the upper working chamber to the lower working chamber within the pressure tube when the shock absorber is extended, the shock absorber is able to produce a damping force which counteracts the vibrations which would otherwise be transmitted from the unsprung mass to the sprung mass during the extension stroke. In the dual tube shock absorber, a fluid reservoir chamber is defined between the pressure tube and a reservoir tube which is positioned around the pressure tube. A base valve assembly is located between the lower working chamber and the reservoir chamber. Because the base valve assembly, through valving, has the ability to limit the flow of damping fluid from the lower working chamber to the reservoir chamber when the shock absorber is compressed, the shock absorber is able to produce a damping force which counteracts the vibrations which would otherwise be transmitted from the unsprung mass to the sprung mass during the compression stroke.

Because the piston rod of the shock absorber extends only through the upper working chamber and not through the lower working chamber, movement of the piston with respect to the pressure tube causes a difference in the amount of fluid displaced in the upper working chamber from the amount of fluid displaced in the lower working chamber. This difference in the amount of fluid displaced is known as the rod volume and it flows through the base valve assembly during both the extension stroke and the compression smoke.

When the shock absorber extends in length, extension stroke, fluid flows through valving in the piston from the upper working chamber to the lower working chamber to create the damping force but an additional volume of fluid is needed in lower working chamber due to the rod volume concept. Thus, fluid will flow from the reservoir chamber to the lower working chamber through a check valve located within the base valve assembly. The check valve does not generate a damping force.

When the shock absorber compresses in length, compression stroke, fluid flows through a check valve in the piston from the lower working chamber to the upper working chamber. The flow through the check valve does not generate a damping force. Due to the rod volume concept, an additional volume of fluid must be removed from the lower working chamber. Thus, fluid will flow from the lower working chamber to the reservoir chamber through valving in the base valve assembly to create the damping force.

In some applications, the continuous flow of fluid into and out of the reservoir chamber through the base valve assembly has led to aeration of the damping fluid. In order to decrease the aeration of the damping fluid, baffle springs have been designed for the reservoir chamber. These prior art baffle springs typically are in the form of a helical spring which is disposed on the pressure tube to extend towards the reservoir tube but not to extend to the pressure tube. Thus, an opening is left between the baffle spring and the reservoir tube.

While these designs of baffle springs have proven to reduce the amount of aeration in certain applications, there is still uncontrolled damping fluid flow possible between the baffle spring and the reservoir tube which enlarges the oil-gas surface and hence worsens the aeration insensitivity.

SUMMARY OF THE INVENTION

The present invention provides the art with a baffle spring which spans the entire width of the reservoir. Thus, the baffle spring contacts both the pressure tube and the reservoir tube to define a helical channel for the fluid flow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
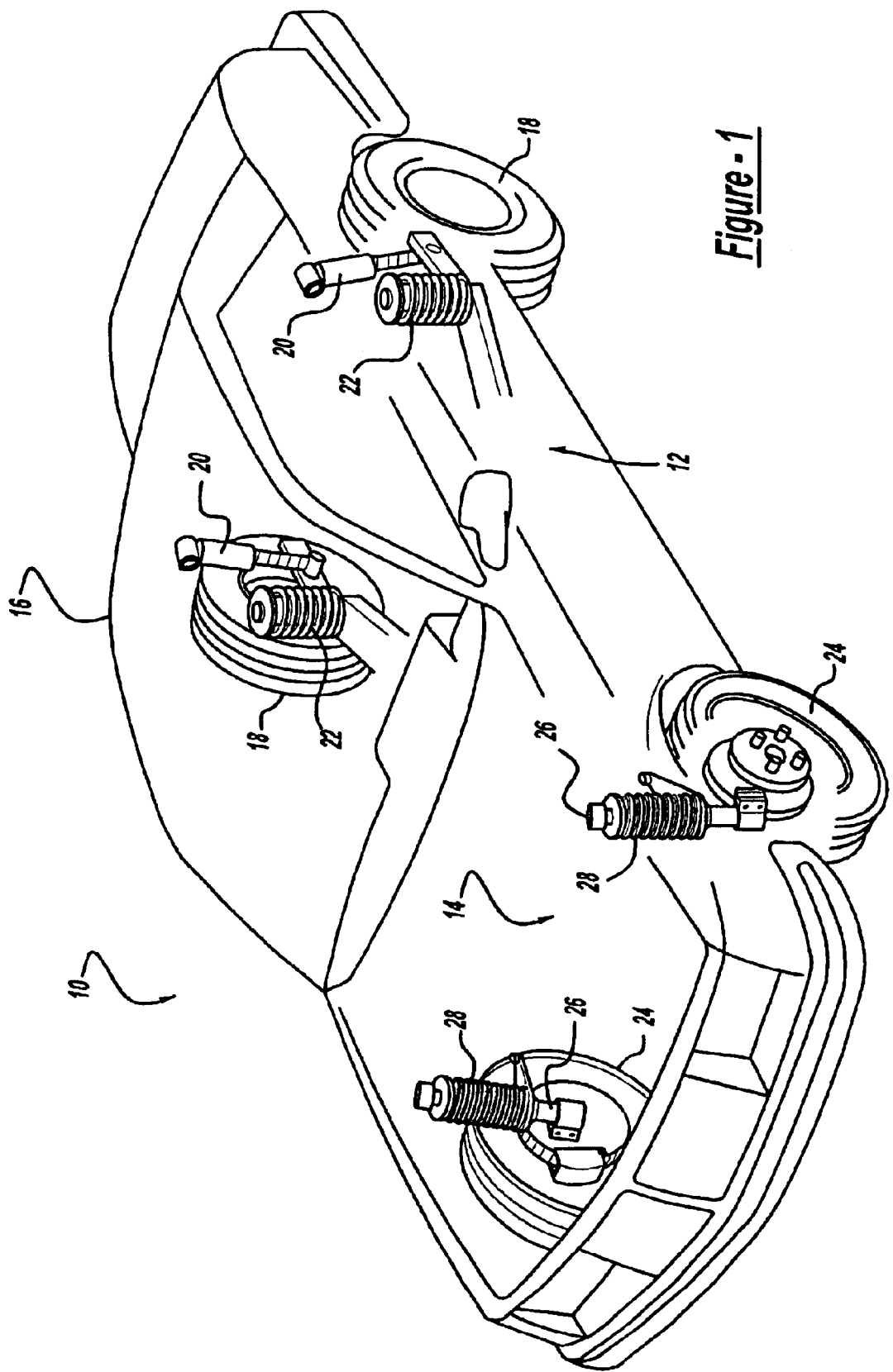
FIG. 1 is a schematic representation of a typical automobile which incorporates shock absorber which include the unique baffle spring in accordance with the present invention.

Referring now to the drawings in which like reference numerals designate like or corresponding parts throughout the several views, there is shown in FIG. 1 a vehicle incorporating a suspension system incorporating the shock absorbers in accordance with the present invention and which is designated generally by the reference numeral 10.

Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
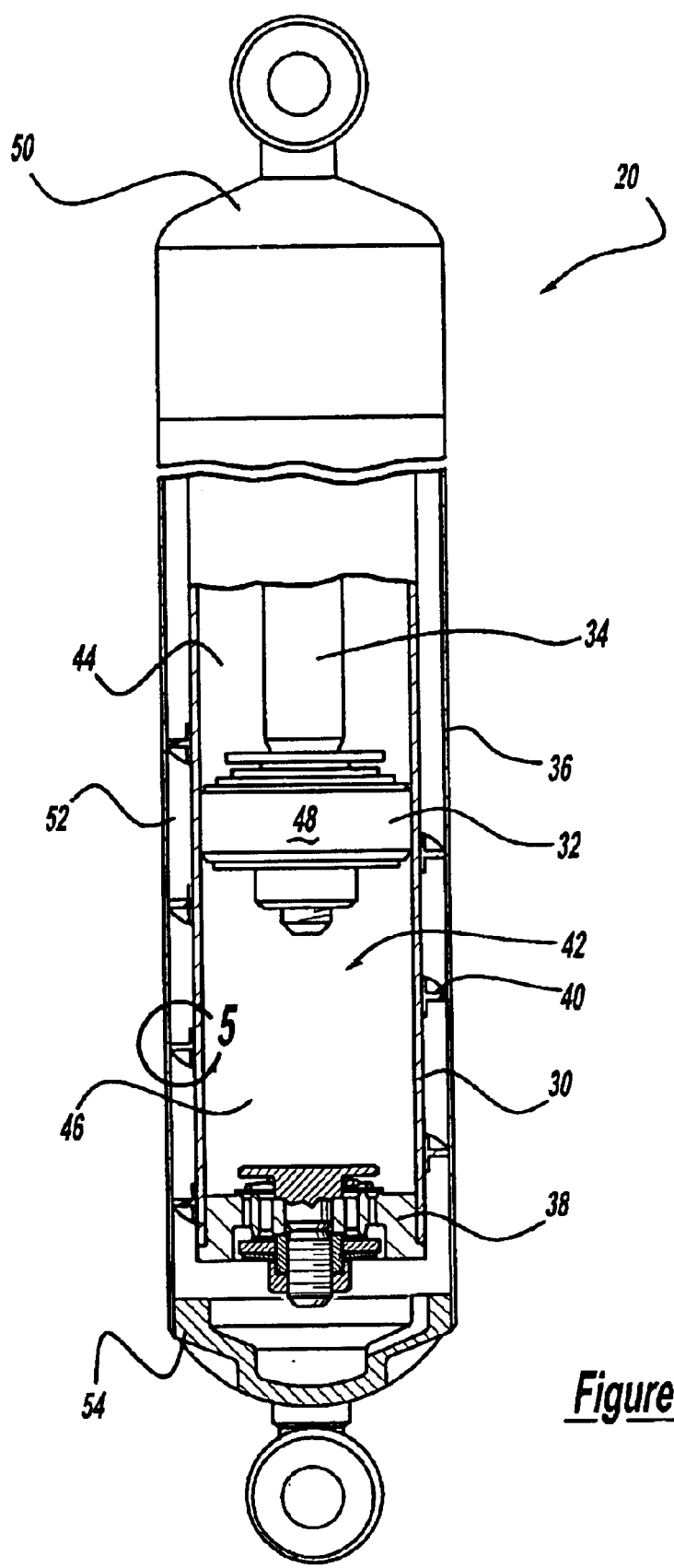
FIG. 2 is a side-sectional view of the shock absorber in accordance with the present invention.

Referring now to FIG. 2, shock absorber 20 is shown in greater detail. While FIG. 2 illustrates only shock absorber 20, it is to be understood that shock absorber 26 also includes the base valve assembly described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reservoir tube 36, a base valve assembly 38 and a baffle in the form of a baffle spring 40.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through end cap 50 which closes the upper end of pressure tube 30. A sealing system seals the interface between upper end cap 50, reservoir tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reservoir tube 36 surrounds pressure tube 30 to define a fluid reservoir chamber 52 located between tubes 30 and 36. The bottom end of reservoir tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
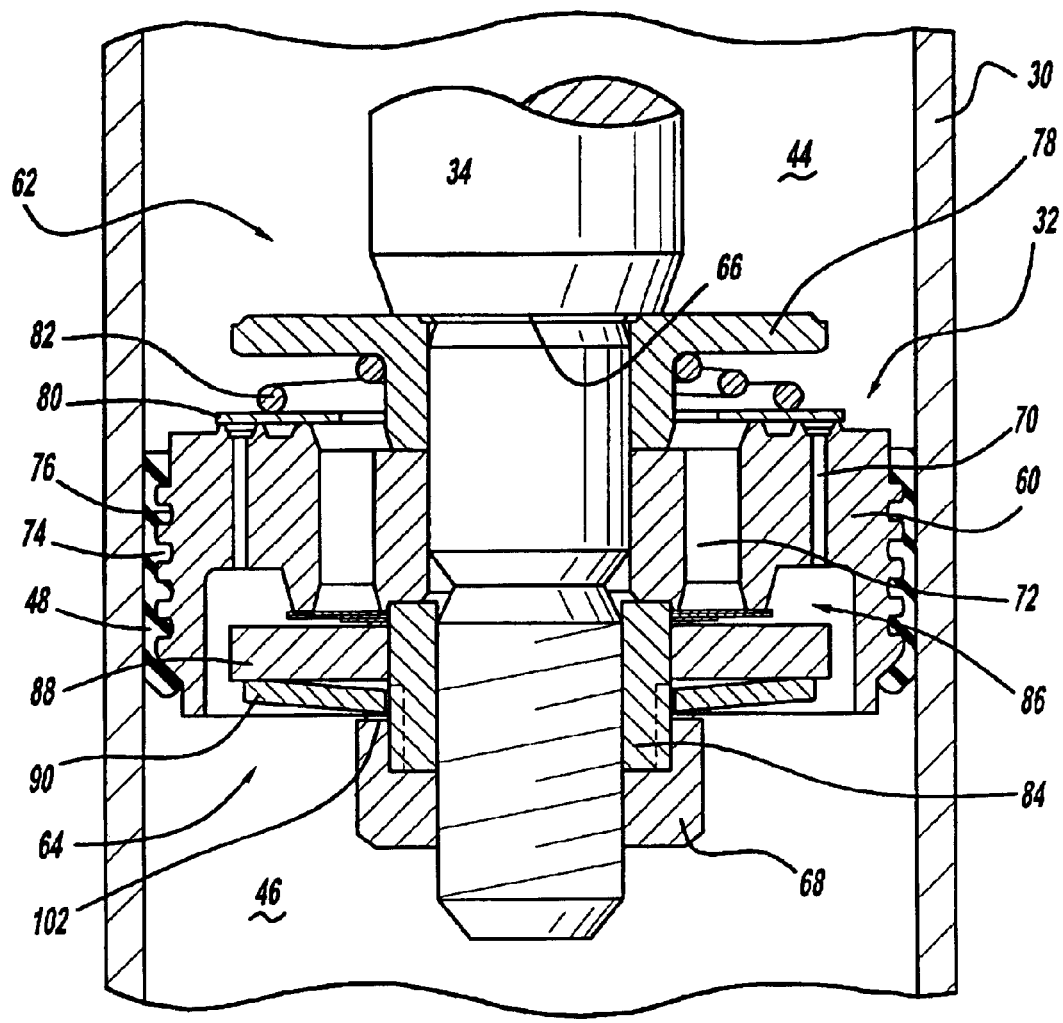
FIG. 3 is an enlarged cross-sectional view of the piston assembly in accordance with the present invention.

Referring now to FIG. 3, piston assembly 32 comprises a piston body 60, a compression valve assembly 62 and a rebound valve assembly 64. Compression valve assembly 62 is assembled against a shoulder 66 on piston rod 34. Piston body 60 is assembled against compression valve assembly 62 and rebound valve assembly 64 is assembled against piston body 60. A nut 68 secures these components to piston rod 34.

Piston body 60 defines a plurality of compression passages 70 and a plurality of rebound passages 72. Seal 48 includes a plurality of ribs 74 which mate with a plurality of annular grooves 76 to permit sliding movement of piston assembly 32.

Compression valve assembly 62 comprises a retainer 78, a valve disc 80 and a spring 82. Retainer 78 abuts shoulder 66 on one end and piston body 60 on the other end. Valve disc 80 abuts piston body 60 and closes compression passages 70 while leaving rebound passages 72 open. Spring 82 is disposed between retainer 78 and valve disc 80 to bias valve disc 80 against piston body 60. During a compression stroke, fluid in lower working chamber 46 is pressurized causing fluid pressure to react against valve disc 80. When the fluid pressure against valve disc 80 overcomes the biasing load of spring 82, valve disc 80 separates from piston body 60 to open compression passages 70 and allow fluid flow from lower working chamber 46 to upper working chamber 44. Typically spring 82 only exerts a light load on valve disc 80 and compression valve assembly 62 acts as a check valve between chambers 46 and 44. The damping characteristics for shock absorber 20 during a compression stroke are controlled by base valve assembly 38 which accommodates the flow of fluid from lower working chamber 46 to reservoir chamber 52 due to the "rod volume" concept as detailed below. During a rebound stroke, compression passages 70 are closed by valve disc 80.

Rebound valve assembly 64 comprises a spacer 84, a plurality of valve discs 86, a retainer 88 and a Belleville spring 90. Spacer 84 is threadingly received on piston rod 34 and is disposed between piston body 60 and nut 68. Spacer 84 retains piston body 60 and compression valve assembly 62 while permitting the tightening of nut 68 without compressing either valve disc 80 or valve discs 86. Retainer 78, piston body 60 and spacer 84 provide a continuous solid connection between shoulder 66 and nut 68 to facilitate the tightening and securing of nut 68 to spacer 84 and thus to piston rod 34. Valve discs 86 are slidingly received on spacer 84 and abut piston body 60 to close rebound passages 72 while leaving compression passages 70 open. Retainer 88 is also slidingly received on spacer 84 and it abuts valve discs 86. Belleville spring 90 is assembled over spacer 84 and is disposed between retainer 88 and nut 68 which is threadingly received on spacer 84. Belleville spring 90 biases retainer 88 against valve discs 86 and valve discs 86 against piston body 60. A shim 102 is located between nut 68 and Belleville spring 90 to control the preload for Belleville spring 90 and thus the blow off pressure as described below. Thus, the calibration for the blow off feature of rebound valve assembly 64 is separate from the calibration for compression valve assembly 62.

During a rebound stroke, fluid in upper working chamber 44 is pressurized causing fluid pressure to react against valve discs 86. When the fluid pressure reacting against valve discs 86 overcomes the bending load for valve discs 86, valve discs 86 elastically deflect opening rebound passages 72 allowing fluid flow from upper working chamber 44 to lower working chamber 46. The strength of valve discs 86 and the size of rebound passages 72 will determine the damping characteristics for shock absorber 20 in rebound. When the fluid pressure within upper working chamber 44 reaches a predetermined level, the fluid pressure will overcome the biasing load of Belleville spring 90 causing axial movement of retainer 88 and the plurality of valve discs 86. The axial movement of retainer 88 and valve discs 86 fully opens rebound passages 72 thus allowing the passage of a significant amount of damping fluid creating a blowing off of the fluid pressure which is required to prevent damage to shock absorber 20 and/or vehicle 10.

Figure 4:
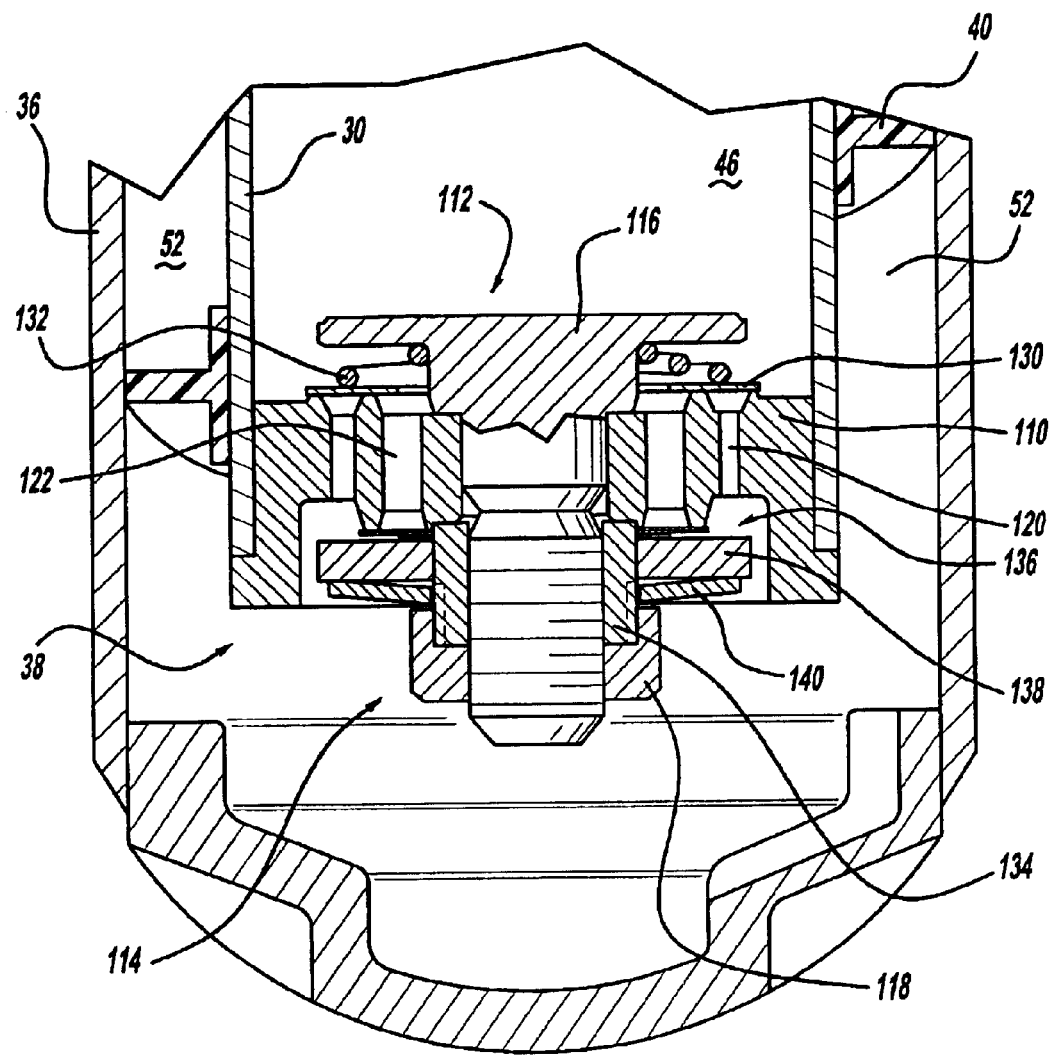
FIG. 4 is an enlarged cross-sectional view of the base valve assembly in accordance with the present invention.

Referring now to FIG. 4, base valve assembly 38 comprises a valve body 110, a rebound valve assembly 112, a compression valve assembly 114 and a bolt 116. Rebound valve assembly 112 is assembled against the head of bolt 116. Valve body 110 is assembled against valve body 110. A nut 118 secures these components to bolt 116.

Valve body 110 defines a plurality of rebound passages 120 and a plurality of compression passages 122. Valve body 110 is press fit or otherwise attached to the end of pressure tube 30.

Rebound valve assembly 112 comprises a valve disc 130 and a spring 132. Valve disc 130 abuts valve body 110 and closes rebound passages 120 while leaving compression passages 122 open. Spring 132 is disposed between the head of bolt 116 and valve disc 130 to bias valve disc 130 against valve body 110. During a rebound stroke due to the "rod volume" concept, fluid in lower working chamber 46 is reduced in pressure causing fluid pressure from within reservoir chamber 52 to react against valve disc 130. When the fluid pressure against valve disc 130 overcomes the biasing load of spring 132, valve disc 130 separates from valve body 110 to open rebound passages 120 and allow fluid flow from reservoir chamber 52 to lower working chamber 46. Typically, spring 132 only exerts a light load on valve disc 130 and rebound valve assembly 112 acts as a check valve between chambers 52 and 46. The damping characteristics for shock absorber 20 during a rebound stroke are controlled by rebound valve assembly 64 as detailed above. During a compression stroke, rebound passages 120 are closed by valve disc 130.

Compression valve assembly 114 comprises a spacer 134, a plurality of valve discs 136, a retainer 138 and a Belleville spring 140. Spacer 134 is threadingly received on bolt 116 and is disposed between valve body 110 and nut 118. Spacer 134 retains valve body 110 and rebound valve assembly 112 while permitting the tightening of nut 118 without compressing either valve disc 130 or valve discs 136. Valve body 110 and spacer 134 provide a continuous solid connection between the head of bolt 116 and nut 118 to facilitate the tightening and securing of nut 118 to spacer 134 and thus to bolt 118. Valve discs 136 are slidingly received on spacer 134 and abut valve body 110 to close compression passages 122 while leaving rebound passages 120 open. Retainer 138 is also slidingly received on spacer 134 and it abuts valve discs 136. Belleville spring 140 biases retainer 138 against valve discs 136 and valve discs 136 against valve body 110. A shim 152 is located between nut 118 and Belleville spring 140 to control the preload for Belleville spring 140 and thus the blow off pressure as described below. Thus, the calibration for the blow off feature of compression valve assembly 114 is separate from the calibration of rebound valve assembly 112.

During a compression stroke, fluid in lower working chamber 46 is pressurized causing fluid to react against valve discs 136. When the fluid pressure reacting against valve discs 136 overcomes the bending load for valve discs 136, valve discs 136 with elastically deflect to open compression passages 122 allowing fluid flow from lower working chamber 46 to reservoir chamber 52. Fluid flow will also occur through compression valve assembly 62 in piston assembly 32 from lower working chamber 46 to upper working chamber 44. The flow of fluid through compression valve assembly 114 occurs due to the "rod volume" concept. The strength of valve discs 136 and the size of compression passages 122 will determine the damping characteristics for shock absorber 20 in compression. When the fluid pressure within lower working chamber 46 reaches a predetermined level, the fluid pressure will overcome the biasing load of Belleville spring 140 causing axial movement of retainer 138 and the plurality of valve discs 136. The axial movement of retainer 138 and valve discs 136 fully opens compression passages 122 thus allowing the passage of a significant amount of damping fluid creating a blowing off of the fluid pressure which is required to prevent damage to shock absorber 20 and/or vehicle 10.

In some applications, the movement of fluid into and out of reservoir chamber 52 causes aeration of the hydraulic fluid. The amount of aeration for each application is different with certain applications being very sensitive to the aeration problem. For these applications extremely sensitive to aeration, the performance of the prior art baffle springs has been found to be insufficient.

Figure 5:
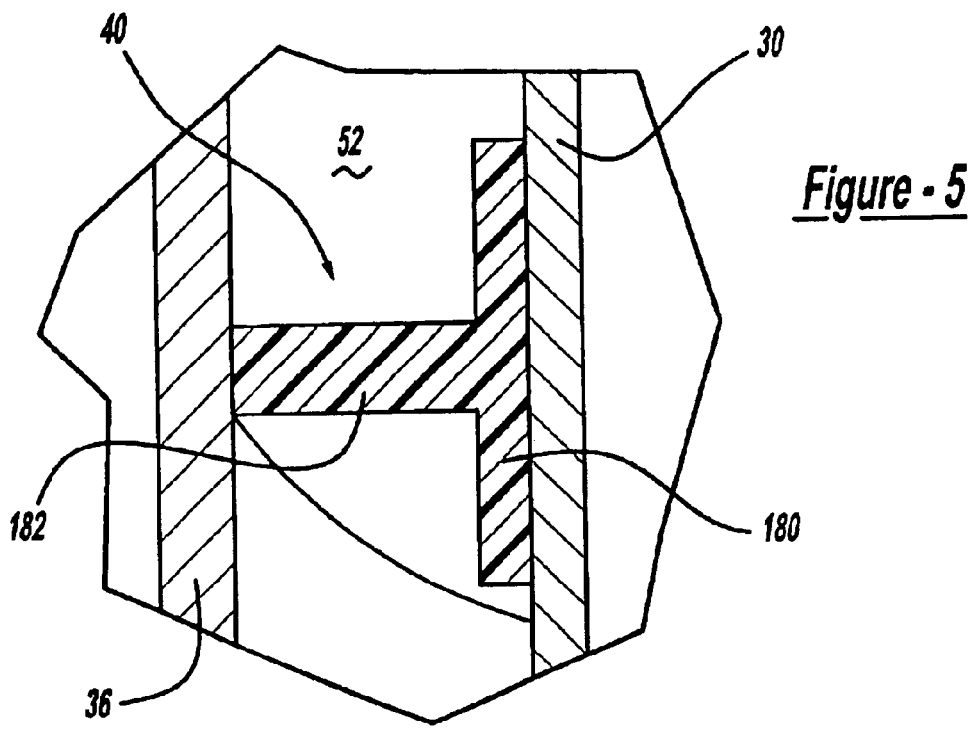
FIG. 5 is an enlarged cross-sectional view of the baffle spring located between the pressure tube and the reservoir tube in accordance with the present invention.

Baffle spring 40 has proven to reduce the sensitivity to aeration by a wide margin. Baffle spring 40 has a T-shape cross section as illustrated in FIG. 5. T-shaped baffle spring 40 comprises a base section 180 which engages pressure tube 30 and an upright section 182 which extends from base section 180 to engage reservoir tube 36. Baffle spring 40 is an elastomeric or rubber molding that is helicoidally wound around pressure tube 30 and is attached to pressure tube 30 using an adhesive or by other methods known well in the art. The height of upright section 182 is such that baffle spring 40 is slightly oversize relative to the inside diameter of reservoir tube 36. The oversize dimensioning of baffle spring 40 in relation to reservoir tube 36 ensures a sufficient clinching of baffle spring 40 between pressure tube 30 and reservoir tube 36.

Baffle spring 40 forces the fluid flow within reservoir chamber 52 to follow the helical channel that is formed by the space created between baffle spring 40, pressure tube 30 and reservoir tube 36. The oversize nature of baffle spring 40 in relation to the inner diameter of reservoir tube 36 provides a sufficient degree of sealing between baffle spring 40 and tubes 30 and 36.

Figure 6:
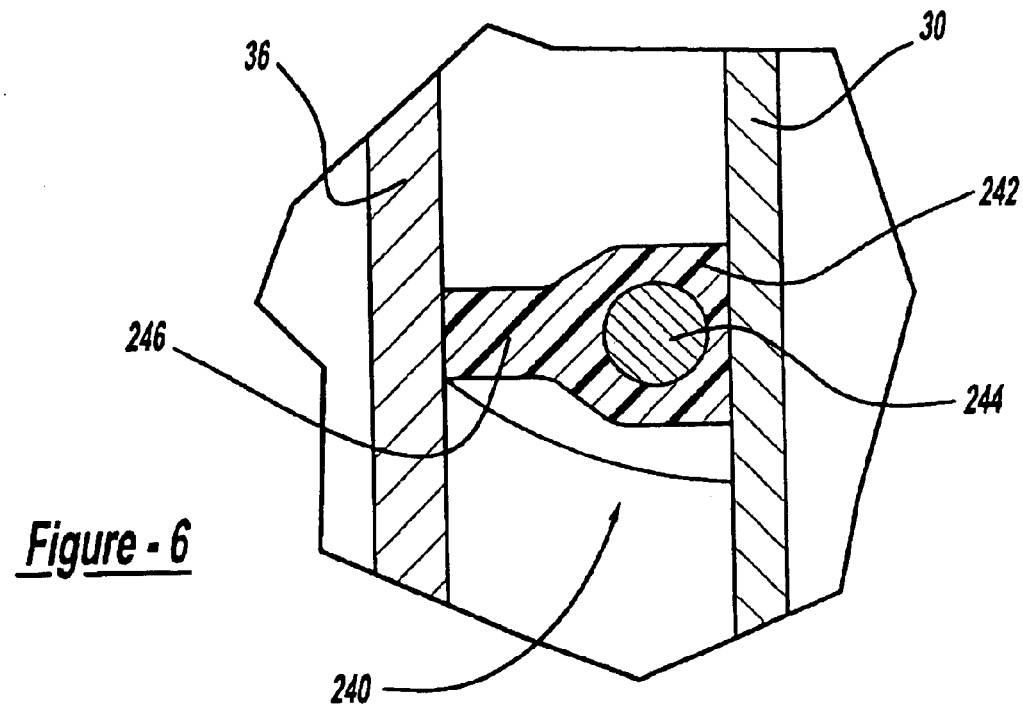
FIG. 6 is an enlarged cross-sectional view of a baffle spring located between the pressure tube and the reservoir tube similar to FIG. 3 but in accordance with another embodiment of the present invention.

Referring now to FIG. 6, a baffle spring 240 in accordance with an other embodiment of the present invention is illustrated. Baffle spring 240 comprises a base section 242 having a metal wire 244 disposed within base section 242 and an upright section 246 extending from base section 240 to engage reservoir tube 36. Baffle spring 240 is an elastomeric or rubber molding that is reinforced by metal wire 244. Baffle spring 240 is helicoidally wound around pressure tube 30 and is attached to pressure tube 30 using the resiliency of metal wire 244. The height of upright section 246 is such that baffle spring 240 is slightly oversize relative to the inside diameter of reservoir tube 36. the oversize dimensioning of baffle spring 240 in relation to reservoir tube 36 ensures a sufficient clinching of baffle spring 240 between pressure tube 30 and reservoir tube 36.

Baffle spring 240 forces the fluid flow within reservoir chamber 52 to follow the helical channel that is formed by the space created between baffle spring 240, pressure tube 30 and reservoir tube 36. The oversize nature of baffle spring 240 in relation to the inside diameter of reservoir tube 36 provides a sufficient degree of sealing between baffle spring 240 and tubes 30 and 36.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber comprising:
   a pressure tube forming a working chamber;
   a piston slidably disposed within said working chamber, said piston body dividing said working chamber into an upper working chamber and a lower working chamber;
   a piston rod attached to said piston body, said piston body extending through one end of said pressure tube;
   a reservoir tube surrounding said pressure tube to form a reservoir chamber between said reservoir tube and said pressure tube;
   a base valve assembly disposed between said working chamber and said reservoir chamber; and
   a baffle helicoidally wound within said reservoir chamber, said baffle engaging said pressure tube and said reserve tube to define helical flow channel between a first portion of said reservoir chamber and second portion of said reservoir chamber.

2. The shock absorber according to claim 1 wherein said first portion of said helical flow channel is adjacent said base valve assembly.

3. The shock absorber according to claim 1 wherein said baffle comprises a baffle spring.

4. The shock absorber according to claim 1 wherein said baffle has a T-shaped cross section.

5. The shock absorber according to claim 4 wherein said T-shaped cross section includes a base section engaging said pressure tube and an upright section engaging said reservoir tube.

6. The shock absorber according to claim 4 wherein said baffle comprises an elastomeric material.

7. The shock absorber according to claim 1 wherein said baffle includes a base section and an upright section.

8. The shock absorber according to claim 7 wherein said baffle includes a wire disposed within said base section.

9. The shock absorber according to claim 7 wherein said base section engages said pressure tube and said upright section engages said reservoir tube.

10. The shock absorber according to claim 7 wherein said baffle comprises an elastomeric material.

11. The shock absorber according to claim 1 wherein said baffle comprises an elastomeric material.

12. A shock absorber comprising:
    a pressure tube forming a working chamber;
    a piston slidably disposed within said working chamber, said piston body dividing said working chamber into an upper working chamber and a lower working chamber;
    a piston rod attached to said piston body, said piston body extending through one end of said pressure tube;
    a reservoir tube surrounding said pressure tube to form a reservoir chamber between said reservoir tube and said pressure tube;
    a base valve assembly disposed between said working chamber and said reservoir chamber; and
    a baffle disposed within said reservoir chamber, said baffle defining a non-linear flow channel between a first portion of said reservoir chamber and second portion of said reservoir chamber, said non-linear flow channel being the only flow channel between said first and second portions of said reservoir chamber; wherein
    said baffle has a T-shaped cross section.

13. The shock absorber according to claim 12 wherein said T-shaped cross section includes a base section engaging said pressure tube and an upright section engaging said reservoir tube.

14. The shock absorber according to claim 12 wherein said baffle comprises an elastomeric material.

15. A shock absorber comprising:
    a pressure tube forming a working chamber;
    a piston slidably disposed within said working chamber, said piston body dividing said working chamber into an upper working chamber and a lower working chamber;
    a piston rod attached to said piston body, said piston body extending through one end of said pressure tube;
    a reservoir tube surrounding said pressure tube to form a reservoir chamber between said reservoir tube and said pressure tube;
    a base valve assembly disposed between said working chamber and said reservoir chamber; and
    a baffle disposed within said reservoir chamber, said baffle defining a non-linear flow channel between a first portion of said reservoir chamber and second portion of said reservoir chamber, said non-linear flow channel being the only flow channel between said first and second portions of said reservoir chamber; wherein
    said baffle includes a base section and an upright section; and
    said baffle includes a wire disposed within said base section.

16. A shock absorber comprising:
    a pressure tube forming a working chamber;
    a piston slidably disposed within said working chamber, said piston body dividing said working chamber into an upper working chamber and a lower working chamber;
    a piston rod attached to said piston body, said piston body extending through one end of said pressure tube;
    a reservoir tube surrounding said pressure tube to form a reservoir chamber between said reservoir tube and said pressure tube;
    a base valve assembly disposed between said working chamber and said reservoir chamber; and
    a baffle disposed within said reservoir chamber, said baffle defining a non-linear flow channel between a first portion of said reservoir chamber and second portion of said reservoir chamber, said non-linear flow channel being the only flow channel between said first and second portions of said reservoir chamber; wherein
    said baffle includes a base section and an upright section; and
    said baffle comprises an elastomeric material.

* * * * *